(12) United States Patent
Bankoski et al.

(10) Patent No.: US 8,891,626 B1
(45) Date of Patent: Nov. 18, 2014

(54) CENTER OF MOTION FOR ENCODING MOTION FIELDS

(75) Inventors: James Bankoski, Wynantskill, NY (US); Paul Wilkins, Cambridge (GB)

(73) Assignee: Google Inc., Mountain View, CA (US)

( * ) Notice: Subject to any disclaimer, the term of this patent is extended or adjusted under 35 U.S.C. 154(b) by 740 days.

(21) Appl. No.: 13/080,266

(22) Filed: Apr. 5, 2011

(51) Int. Cl.
*H04B 1/66* (2006.01)

(52) U.S. Cl.
USPC ..................................... 375/240.16

(58) Field of Classification Search
USPC ....................................... 348/699
See application file for complete search history.

(56) References Cited

U.S. PATENT DOCUMENTS

| | | |
|---|---|---|
| 4,924,310 A | 5/1990 | von Brandt |
| 5,148,269 A | 9/1992 | de Haan et al. |
| 5,337,086 A | 8/1994 | Fujinami |
| 5,398,068 A | 3/1995 | Liu et al. |
| 5,461,708 A | 10/1995 | Kahn |
| 5,512,952 A | 4/1996 | Iwamura |
| 5,550,964 A | 8/1996 | Davoust |
| 5,581,678 A | 12/1996 | Kahn |
| 5,610,658 A | 3/1997 | Uchida et al. |
| 5,611,034 A | 3/1997 | Makita |
| 5,731,840 A | 3/1998 | Kikuchi et al. |
| 5,742,710 A | 4/1998 | Hsu et al. |
| 5,886,742 A | 3/1999 | Hibi et al. |
| 5,987,180 A | 11/1999 | Reitmeier |
| 5,991,447 A | 11/1999 | Eifrig et al. |
| 6,005,980 A | 12/1999 | Eifrig et al. |
| 6,011,870 A | 1/2000 | Jeng et al. |
| 6,014,181 A | 1/2000 | Sun |
| 6,272,179 B1 | 8/2001 | Kadono |
| 6,289,049 B1 | 9/2001 | Kim et al. |
| 6,359,929 B1 | 3/2002 | Boon |
| 6,381,277 B1 | 4/2002 | Chun et al. |
| 6,507,617 B1 * | 1/2003 | Karczewicz et al. ..... 375/240.16 |
| 6,711,211 B1 | 3/2004 | Lainema |

(Continued)

FOREIGN PATENT DOCUMENTS

| | | |
|---|---|---|
| EP | 0634873 B1 | 9/1998 |
| EP | 0979011 | 2/2000 |

(Continued)

OTHER PUBLICATIONS

Bankoski et al. "Technical Overview of VP8, an Open Source Video Codec for the Web". Dated Jul. 11, 2011.

(Continued)

*Primary Examiner* — William C Vaughn, Jr.
*Assistant Examiner* — Naod Belai
(74) *Attorney, Agent, or Firm* — Young Basile Hanlon & MacFarlane P.C.

(57) ABSTRACT

A system and method for encoding and decoding a video is disclosed having a plurality of frames with spatially correspondent blocks comprised of pixels. The encoding method includes determining a motion field for a plurality of pixels in a first frame having a same direction of movement as each other, the motion field having a center of motion, at least one dimension defining a shape of the motion field and a motion vector, encoding the motion field into a bitstream, associating at least one block of the first frame with the motion field and encoding each block associated with the motion field into the bitstream without a separate motion vector. Motion fields can be reused across multiple frames, decreasing the number of bits spent to encode motion vectors.

21 Claims, 9 Drawing Sheets

(56) References Cited

U.S. PATENT DOCUMENTS

| | | | |
|---|---|---|---|
| 6,735,249 B1 | 5/2004 | Karczewicz et al. | |
| 7,002,580 B1 | 2/2006 | Aggala et al. | |
| 7,463,685 B1 | 12/2008 | Haskell et al. | |
| 7,581,168 B2 | 8/2009 | Boon | |
| 7,705,847 B2 | 4/2010 | Helfman et al. | |
| 7,978,770 B2 | 7/2011 | Luo et al. | |
| 8,006,194 B2 | 8/2011 | Berger et al. | |
| 2002/0031272 A1 | 3/2002 | Bagni et al. | |
| 2004/0258155 A1* | 12/2004 | Lainema et al. | 375/240.16 |
| 2005/0243926 A1 | 11/2005 | Hubrich et al. | |
| 2006/0209961 A1 | 9/2006 | Han et al. | |
| 2008/0025390 A1* | 1/2008 | Shi et al. | 375/240.02 |
| 2008/0291285 A1* | 11/2008 | Shimizu | 348/208.6 |
| 2009/0016439 A1 | 1/2009 | Thoreau et al. | |
| 2010/0079624 A1* | 4/2010 | Miyasako | 348/241 |
| 2012/0075535 A1* | 3/2012 | Van Beek | 348/699 |

FOREIGN PATENT DOCUMENTS

| | | |
|---|---|---|
| EP | 1091592 | 4/2001 |
| WO | WO9941912 | 8/1999 |
| WO | WO03043342 | 5/2003 |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Mozilla, "Introduction to Video Coding Part 1: Transform Coding", Video Compression Overview, Mar. 2012, 171 pp.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Peng, Qiang, T. Yang, and C Zhu, Block-based temporal error concealment for video packet using motion vector extrapolation, 2002 International Conference on Communications, Circuits and Systems and West Sino Exposition Proceedings, 10-14 vol. 1:2.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Nokia, Inc., Nokia Research Center, "MVC Decoder Description", Telecommunication Standardization Sector, Study Period 1997-2000, Geneva, Feb. 7, 2000, 99 pp.

Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.

Wright, R. Glenn, et al.; "Multimedia—Electronic Technical Manual for ATE", IEEE 1996, 3 pp.

Schiller, H., et al.; "Efficient Coding of Side Information in a Low Bitrate Hybrid Image Coder", Signal Processing 19 (1990) Elsevier Science Publishers B.V. 61-73, 13 pp.

Strobach, Peter; "Tree-Structured Scene Adaptive Coder", IEEE Transactions on Communications, vol. 38, No. 4, Apr. 1990, 10 pp.

Steliaros, Michael K., et al.; "Locally-accurate motion estimation for object-based video coding", SPIE vol. 3309, 1997, 11 pp.

Martin, Graham R., et al.; "Reduced Entropy Motion Compensation Using Variable Sized Blocks", SPIE vol. 3024, 1997, 10 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Guillotel, Philippe, et al.; "Comparison of motion vector coding techniques", SPIE vol. 2308, 1994, 11 pp.

Orchard, Michael T.; "Exploiting Scene Structure in Video Coding", IEEE 1991, 5 pp.

Liu, Bede, et al.; "A simple method to segment motion field for video coding", SPIE vol. 1818, Visual Communications and Image Processing 1992, 10 pp.

Ebrahimi, Touradj, et al.; "Joint motion estimation and segmentation for very low bitrate video coding", SPIE vol. 2501, 1995, 12 pp.

Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wiegand, Thomas, et al.; "Long-Term Memory Motion-Compensated Prediction", Publication Unknown, Date Unknown, 15 pp.

Zhang, Kui, et al.; "Variable Block Size Video Coding With Motion Prediction and Motion Segmentation", SPIE vol. 2419, 1995, 9 pp.

(56) References Cited

OTHER PUBLICATIONS

Chen, Michael C., et al.; "Design and Optimization of a Differentially Coded Variable Block Size Motion Compensation System", IEEE 1996, 4 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Nicolas, H., et al.; "Region-based motion estimation using deterministic relaxation schemes for image sequence coding", IEEE 1992, 4 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

* cited by examiner

CENTER OF MOTION FOR ENCODING MOTION FIELDS

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes generally break the image up into blocks and may encode a motion vector for each of the blocks on each frame into the resulting digital video bitstream for transmission. Certain techniques are known that re-use a motion vector within a frame. For example, referential encoding in H.264 encodes a motion vector for a block only when there is a difference above a threshold from another block in the same frame. Encoding in VP8 can incorporate techniques known as nearest motion vector (mv) and near mv that also result in the re-use of a motion vector within a frame. Such techniques are described in, for example, U.S. Patent Publication No. 2004/0228410 A1.

SUMMARY

Systems, apparatuses and methods for encoding and decoding a video signal are disclosed. In accordance with one aspect of the disclosed embodiments, a method is provided for encoding a video signal having a plurality of frames including blocks each having pixels. The method comprises determining a motion field for a plurality of pixels in a first frame having a same direction of movement as each other, the motion field having a field center of motion, at least one dimension defining a shape of the motion field and a field motion vector, encoding the motion field into a bitstream, associating at least one block of the first frame with the motion field and encoding each block associated with the motion field into the bitstream without a separate motion vector. Determining the motion field includes determining a motion vector for each of a plurality of blocks of the first frame, grouping the motion vectors for each of the plurality of blocks of the first frame into a plurality of groups based on a proximity of respective ones of the plurality of blocks to others having the same motion vector and calculating the field center of motion and the at least one dimension defining the shape of the motion field using dimensions of the plurality of blocks forming a group of the plurality of groups.

Another aspect of the disclosed embodiments includes a method for decoding a video signal having a plurality of frames including blocks containing pixels. This method comprises decoding a plurality of motion fields received from a bitstream, each of the plurality of motion fields having a field center of motion, at least one dimension defining a shape of the motion field and a field motion vector, receiving a block from the bitstream, the block comprising a plurality of pixels of a first frame, comparing a position of the block with each of the plurality of motion fields, and setting a motion vector of the block to the field motion vector of one of the plurality of motion fields where the position of the block is within the shape of the one of the plurality of motion fields.

An apparatus for encoding a video signal having a plurality of frames including blocks each having pixels according to one aspect taught herein comprises a memory and a processor configured to execute instructions stored in the memory to determine a motion field for a plurality of pixels in a first frame having a same direction of movement as each other, the motion field having a field center of motion, at least one dimension defining a shape of the motion field and a field motion vector, by determining a motion vector for each of a plurality of blocks of the first frame, grouping the motion vectors for each of the plurality of blocks of the first frame into a plurality of groups based on a proximity of respective ones of the plurality of blocks to others having the same motion vector, and calculating the field center of motion and the at least one dimension defining the shape of the motion field using dimensions of the plurality of blocks forming a group of the plurality of groups. The processor of this aspect is also configured to encode the motion field into a bitstream, associate at least one block of the first frame with the motion field and encode each block associated with the motion field into the bitstream without a separate motion vector.

Another aspect of embodiments described herein includes an apparatus for encoding a video signal having a plurality of frames including blocks containing pixels. This apparatus comprises means for determining a motion field for a plurality of pixels in a first frame having a same direction of movement as each other, the motion field having a field center of motion, at least one dimension defining a shape of the motion field and a field motion vector, means for encoding the motion field into a bitstream, means for associating at least one macroblock of the first frame with the motion field, and means for encoding each macroblock associated with the motion field into the bitstream without a separate motion vector. The determining means includes, in this aspect, means for determining a motion vector for each of a plurality of blocks of the first frame, means for grouping the motion vectors for each of the plurality of blocks of the first frame into a plurality of groups based on a proximity of respective ones of the plurality of blocks to others having the same motion vector, and means for calculating the field center of motion and the at least one dimension defining the shape of the motion field using dimensions of the plurality of blocks forming a group of the plurality of groups.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

While current techniques for encoding motion vector information into a digital video bitstream sometimes result in good re-use of motion vectors within a frame, re-use is minimal across frames. In contrast, techniques described herein provide a method and system that re-uses motion vector information across multiple frames. By doing so, the techniques seek to decrease the number of bits spent to encode motion vector information, increasing the compression and reducing the amount of data requiring transmission to reconstruct a video stream for display.

Figure 1:
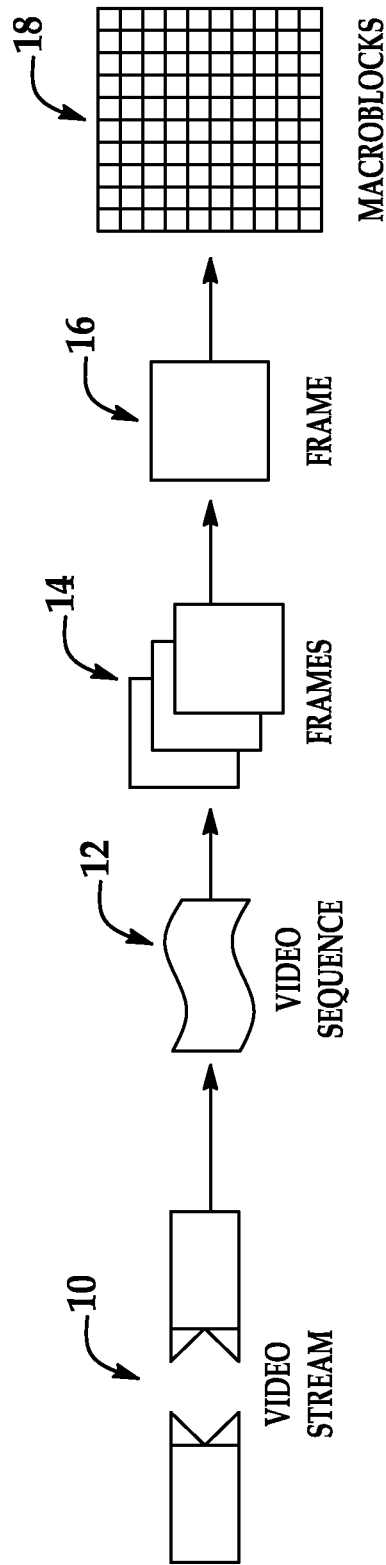
FIG. 1 is a diagram of a video bitstream.

FIG. 1 is a diagram showing a typical video bitstream 10 to be encoded and decoded. Video coding formats, such as VP8 or H.264, provide a defined hierarchy of layers for video stream 10. The highest level in the layer is a video sequence 12. At the next level, video sequence 12 consists of a number of adjacent frames 14, which can be further subdivided into a single frame 16. At the next level, frame 16 can be divided into a series of macroblocks 18, which contain data corresponding to, for example, a 16×16 block of displayed pixels. Each macroblock 18 can contain luminance and chrominance data for the corresponding pixels, and they are generally although not necessarily fixed in size. Macroblocks 18 can also be of any other suitable size such as 16×8 or 8×16 pixel groups and can further be subdivided into smaller blocks depending on the application.

Figure 2:
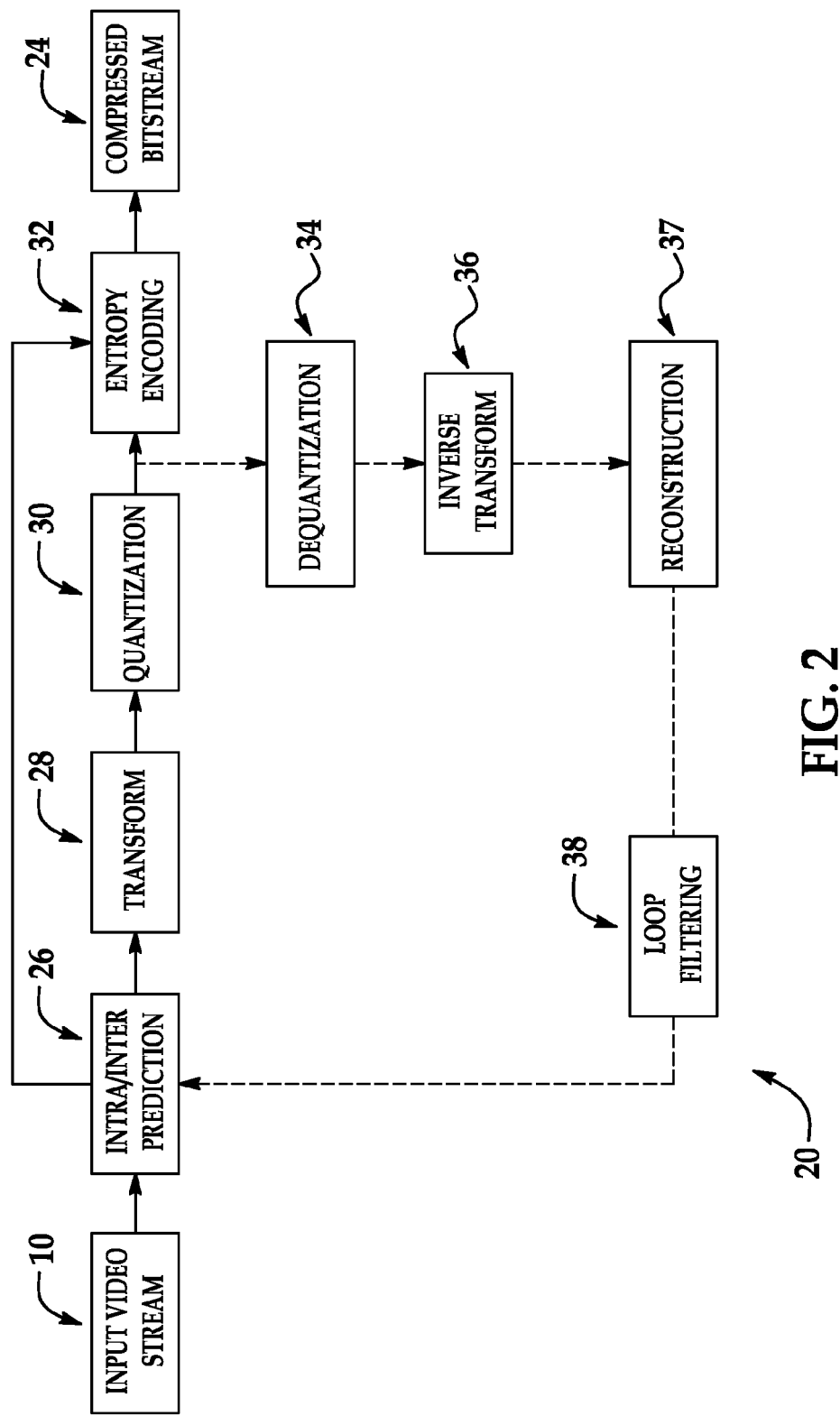
FIG. 2 is a block diagram of a video compression system in accordance with one embodiment.

FIG. 2 is a block diagram of a video compression system in accordance with one embodiment. An encoder 20 encodes an input video stream 10. Encoder 20 in this example has the following stages to perform the various functions in a forward path (shown by the solid connection lines) to produce an encoded or compressed bitstream 24: intra/inter prediction stage 26, transform stage 28, quantization stage 30 and entropy encoding stage 32. Encoder 20 also includes a reconstruction path (shown by the dotted connection lines) to reconstruct a frame for encoding of further macroblocks. As shown, encoder 20 has the following stages to perform the various functions in the reconstruction path: dequantization stage 34, inverse transform stage 36, reconstruction stage 37 and loop filtering stage 38. Other structural variations of encoder 20 can be used to encode bitstream 24.

When input video stream 10 is presented for encoding, each frame 16 within input video stream 10 is processed into units of macroblocks. At intra/inter prediction stage 26, each macroblock can be encoded using either an intra prediction or inter prediction mode. In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more constructed reference frames such as those describe in, for example, U.S. Patent Publication No. 2010-0061461 A1.

Next, still referring to FIG. 2, the prediction macroblock can be subtracted from the current macroblock at stage 26 to produce a residual macroblock (residual). Transform stage 28 transform codes the residual, and quantization stage 30 quantizes the residual to provide a set of quantized transform coefficients. The quantized transform coefficients are then entropy coded by entropy encoding stage 32. The entropy-coded coefficients, together with the information required to decode the macroblock, such as the type of prediction mode used, motion vectors and quantizer value, are then output to compressed bitstream 24.

The reconstruction path in FIG. 2 is present to ensure that both the encoder and the decoder use the same reference frames to decode the macroblocks. The reconstruction path performs functions that are similar to functions that take place during the decoding process that are discussed in more detail below, including dequantizing the transform coefficients at a dequantization stage 34 and inverse transforming the dequantized transform coefficients at an inverse transform stage 36 in order to produce a derivative residual macroblock (derivative residual). At reconstruction stage 37, the prediction macroblock that was predicted at prediction stage 26 can be added to the derivative residual to create a reconstructed macroblock. A loop filter 38 can then be applied to the reconstructed macroblock to reduce blocking distortion.

Other variations of encoder 20 can be used to encode bitstream 24 as mentioned briefly above. For example, a non-transform based encoder can quantize the residual signal directly without transform stage 29. In another embodiment, an encoder may have quantization stage 30 and dequantization stage 34 combined into a single stage.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of input video stream 10. For example, encoder 20 may use this information to select parameters for encoding, locating key-frames and selecting coding modes used to encode macroblocks 18 and to allocate the number of bits to each frame. The output of the second pass can be final compressed bitstream 24.

The coding mode can be used to indicate which motion vector should be used for a block in the second pass. For example, the coding mode can indicate that a new motion vector should be calculated for the block. Alternatively, the coding mode can indicate that the motion vector belonging to a neighboring block should be used, or that no motion vector (i.e., a zero motion vector) should be used. Details of possible choices of motion vectors according to certain embodiments of the invention are described in additional detail hereinafter.

Figure 3:
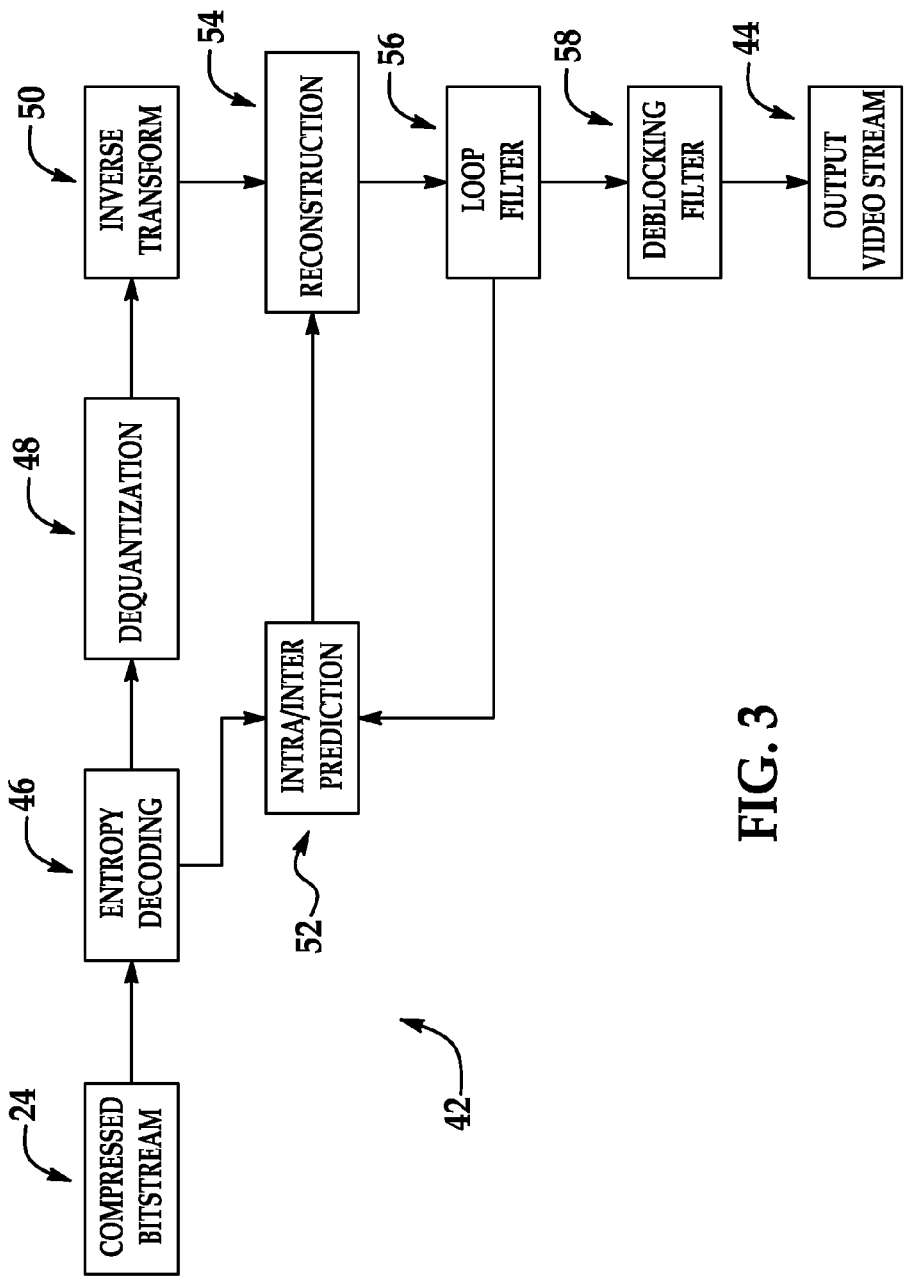
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, can include the following stages to perform various functions to produce an output video stream 44 from compressed bitstream 24: entropy decoding stage 46, dequantization stage 48, inverse transform stage 50, intra/inter prediction stage 52, reconstruction stage 54, loop filter stage 56 and deblocking filtering stage 58. Other structural variations of decoder 42 can be used to decode compressed bitstream 24.

When compressed bitstream 24 is presented for decoding, the data elements within bitstream 24 can be entropy decoded by entropy decoding stage 46 (using for, for example, Context Adaptive Binary Arithmetic Coding) to produce a set of quantized transform coefficients. Dequantization stage 48 dequantizes the transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to further reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames as mentioned above.

Video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder 20 may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from encoding.

As described briefly above, such motion vectors are often encoded on a macroblock-by-macroblock (or block-by-block) basis and re-use of motion vectors is limited.

Embodiments described herein modify processing in the intra/inter prediction stage 26 described above. Rather than splitting the image into blocks or macroblocks and then transmitting a motion vector for each either referentially or by transmitting a new motion vector, the control of intra/inter prediction stage 26 specifies a position where each motion vector is to be applied. Each of these positions is generally specified as a pixel position on the frame and is hereinafter called a center of motion. Together with the center of motion, one or more additional dimensions are also specified that define a field in which any block/macroblock within the field can use the motion vector associated with the center of motion. In the example described with respect to FIGS. 4A-6 below, the dimension is a radius that specifies a circular field. Various other means could be used to specify the shape and size of rectangles, ellipses, etc. Hereinafter, the field defined by a center of motion and its dimension(s) is called a motion field. Further, unless otherwise stated, when referring to blocks, the reference applies equally to macroblocks and vice versa.

According to one method of calculating the center of motion position and its dimension(s), normal motion estimation techniques can first be used on blocks in an image frame. In doing so, it is desirable to bias towards re-using the same motion vector. Each time a new motion vector is to be used, that new motion vector and the row and column positions of the block are stored into a list of blocks using that motion vector. Each time a motion vector is reused, the row and column position of the block that re-use the motion vector is added to the list. After compiling the list of blocks and motion vectors, the centers of motion are calculated by computing an average row and an average column position. A dimension indicating the size of the motion field associated with each center of motion can be computed by, for example, computing the maximum distance between the rows and columns.

Figure 4A:
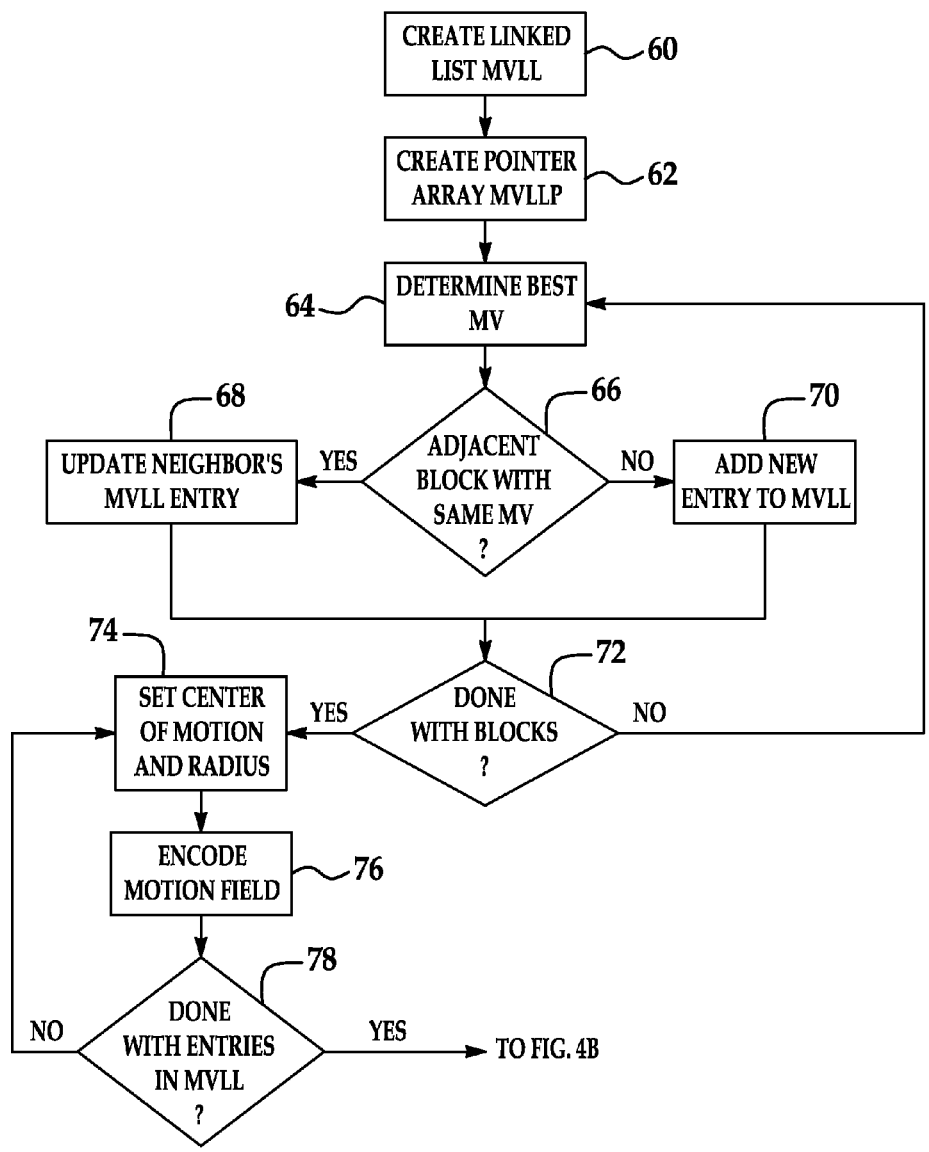
FIGS. 4A and 4B include a flow chart illustrating an exemplary method of encoding motion fields for a first frame using the intra/inter prediction stage of the encoder shown in FIG. 2.
Figure 4B:
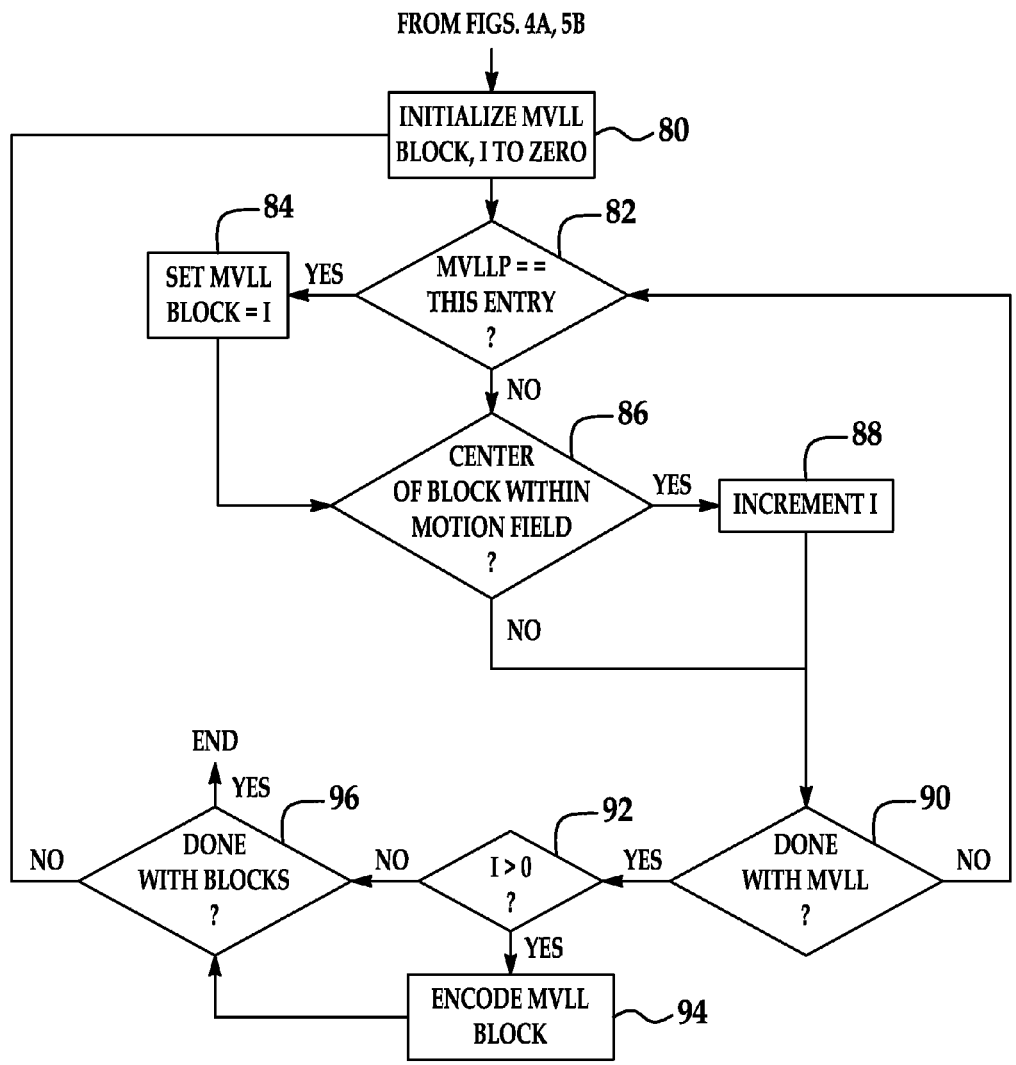

More details of this exemplary method can be had by referring first to FIGS. 4A and 4B. FIGS. 4A and 4B include a flow chart illustrating an exemplary method of encoding motion fields for a first frame using the intra/inter prediction stage 26 shown in FIG. 2.

Initially, an empty linked list called mvll is created (60) in which each item in the list contains variables related to the motion field. The variables can include one or more of the following:
sum of row positions;
sum of column positions;
minimum row;
maximum row;
minimum column;
maximum column;
count of blocks;
motion vector row;
motion vector column;
center of motion row;
center of motion column;
center of motion radius; or
new.

A pointer array called mvllp is created for each block in the frame (62). The array mvllp and linked list mvll are filled as next described.

For each block in the frame, a motion vector that best represents the block is determined by intra/inter prediction stage 26 (64). This best motion vector is determined with a bias toward re-using a motion vector image. That is, any latter-determined motion vector for a block is compared to earlier-determined motion vectors to decide whether an earlier-determined motion vector is close enough to use in place of the latter-determined motion vector. The motion vector for each block may either be null, which indicates there has been no change in motion, or non-zero, which indicates there has been a change in motion. The determination of a motion vector for a block can be performed by any one of a variety of methods known to those skilled in the art. For example, calculating a motion vector is described in US 2004/0228410 A1. That reference also describes one example of biasing the determination of motion vectors toward re-using a vector. Therein, the comparison is made so as to use, for example, the nearest motion vector or a near motion vector. Although this is provided as an example, any motion search method can be used. For example, rate distortion optimized motion estimation compares the increase in quality resulting from extra precision in a motion vector against the extra bits necessary to encode the motion vector to the higher precision (sometimes called the bit cost). According to such a technique, the motion vector with the lowest error adjusted for cost is selected. One exemplary method of comparing bit cost to precision is described in D. T. Hoang et al., "Efficient Cost Measures for Motion Estimation at Low Bit Rates," *IEEE Transactions on Circuits and Systems for Video Technology*, Vol. 8, No. 4, pp. 488-500 (August 1998). Other methods of calculating an error to determine the best motion vector for a block involve calculating the sum of the differences, or the sum of the squares of the differences, of the absolute values on a pixel-by-pixel basis for each block using each possible motion vector and comparing those scores for the lowest error.

If a current block is adjacent to any block with the same motion vector (66), the mvll entry with which the neighbor block is associated is updated (68). In particular, control looks up the neighbor block's mvll entry and sets the current block's mvllp to the neighbor block's mvll entry. That is, the pointer for the current block is directed to the same mvll entry as the neighbor block.

To update the mvll entry, the variables defined initially are updated. Specifically, the current block's row is added to the sum of row positions, and the current block's column to the sum of column positions. The count of blocks is incremented by 1. Further, the dimensions of the mvll entry are updated to accommodate those of the current block. More specifically, if the current block's row is centered at a position less than the position stored in minimum row, minimum row is set to the current block's center row position. If the current block's row is centered at a position greater than the position stored in maximum row, maximum row is set to the current block's center row position. Similarly, if the current block's column is centered at a position less than the position stored in minimum column, minimum column is set to the current block's center column position. If the current block's column is centered at a position greater than the position stored in maximum column, maximum column is set to the current block's center column position.

In contrast, if the current block is not adjacent to any block with the same motion vector (66), a new entry is created in the linked list mvll (70). The current block's mvllp is set, or pointed, to the new entry, and the variables for the new entry are set in accordance with the current block. That is, sum of row positions, minimum row and maximum row are set to correspond to the positions for the current block's row. Similarly, sum of column positions, minimum column and maximum column are set to correspond to the positions for the current block's column. The variable count of blocks is set to 1, motion vector is set to the motion vector determined for the current block, and the center of motion is set to (0,0). Note that when discussing the positions for rows and columns here and earlier, such positions refer to pixel positions in the array defined by the frame as is conventionally done. For example, assume the existence of four blocks centered respectively at row 8, column 24; row 8, column 40; row 8, column 56; and row 24, column 40, each having the same motion vector and defining a motion field. In this example, the minimum row would be 8, the maximum row would be 24, the minimum column would be 24 and the maximum column would be 56. The sum of row positions for this motion field would be 48 (=8+8+8+24), while the sum of column positions would be 160 (=24+40+56+40).

Whether an existing mvll entry is updated (68) or a new mvll entry is added (70), a query is made as to whether all blocks in the frame have been sorted (72). If not all blocks have been sorted, control returns to determine the best motion vector for the next block (64) so as to sort the next block (66).

Once all blocks are sorted (72), each entry of linked list mvll is reviewed to encode its center of motion and radius (74). That is, the center of motion and radius are set for each entry of linked list mvll. These values are set according to the following calculations:

center of motion row=sum of row positions/count of blocks;

center of motion column=sum of column positions/count of blocks; and center of motion radius=max(maximum row−minimum row,maximum column−minimum column)/2.

In the example above, the count of blocks would be 4. Therefore, the center of motion row would be at 12 (=48/4), while the center of motion column would be at 40 (=160/4). The center of motion radius would be the greater of (24−8)/2 or (56−24)/2, that is, 16. The motion field defined by the center of motion row, center of motion column and center of motion radius is encoded into the bitstream according to known encoding techniques (76). Once this step is completed, whether all entries in the linked list mvll have been processed is queried (78). If not, control returns to process the next entry by setting the center of motion and radius (74) and encoding the motion field (76). If all entries in the linked list mvll have been processed (78), each block is associated with a motion field and encoded in accordance with the continuation of the flow chart in FIG. 4B As shown in FIG. 4B, control initializes variables (80). Namely, a counter i is initialized to zero, and a status identifier for a block indicating its association with an entry in linked list mvll is initialized to zero. This status identifier is called "mvll block" hereinafter. Essentially, mvll block indicates which center of motion the current block "belongs with" when the current block is in overlapping motion fields. That is, mvll block associates the current block with only one indexed entry in the linked list mvll, and thus with only one center of motion.

Whether the pointer mvllp for the current block points to the current entry of linked list mvll is queried (82). If the response to the query is yes, mvll block is set equal to i (84). If the response to the query is no, control confirms whether or not the block is within the motion field of the entry (86) by performing the following comparisons:

center of motion row−radius<center row position of current block; and center of motion row+radius>center row position of current block; and center of motion column−radius<center column position of current block; and center of motion column+radius>center column position of current block.

If the response to each of these comparisons is true, counter i is incremented by one (88). In contrast, if any of these comparisons is false, this indicates that the center of the current block is outside of the current motion field. The response to the query is no.

Whether counter i is incremented (88) or not, a query is made as to whether all entries in the linked list mvll have been compared to the current block (90). If no, pointer mvllp for the current block is compared to the new entry of the linked list mvll (82). This processing continues until the current block has been compared to all entries in the linked list mvll (90).

Note that the specification of various motion fields can result in those that overlap. That is, adjacent motion fields could overlap such that portions of a block could be in more than one motion field, such that more than one motion vector may be applicable to that portion of the block. By performing the steps of comparing the block's mvllp and center position to each entry in the linked list mvll, a single center of motion can be selected as the best match for the block. Next, whether counter i is greater than zero is queried (92). The value of counter i (and hence mvll block) indicates which center of motion the current block belongs with, and bits are encoded in the bitstream indicating the association of the current block with an mvll entry according to known encoding methods (94).

Whether the variable mvll block is encoded for the current block (94) or the counter i is not greater than zero (92), a query is made as to whether all blocks have been processed (96). If not, processing is repeated to compare the next block to the entries of the linked list mvll starting with the initialization of the mvll block and the setting of counter i to zero (80). If all blocks have been processed (96), control ends.

The process described above specifies which motion vector to use amongst all of the overlapping possibilities at the block or macroblock level. Other techniques are possible. For example, a block not encompassed in a single motion field can be subjected to techniques such as rate distortion optimized motion estimation described above that are used to calculate encoding errors for each of the motion vectors of a motion field in which at least part of the block is located. The lowest resulting encoding error can determine with which motion field the block would be associated when encoding the block. Further optimizations to this technique can involve breaking up a large area into smaller areas to cut down on bits spent encoding overlap areas.

Once each motion field is defined for a frame, the center of motion is moved by its motion vector in subsequent frames and only differences to each center of motion are encoded. This is described in more detail with reference to FIGS. 5A and 5B.

Figure 5A:
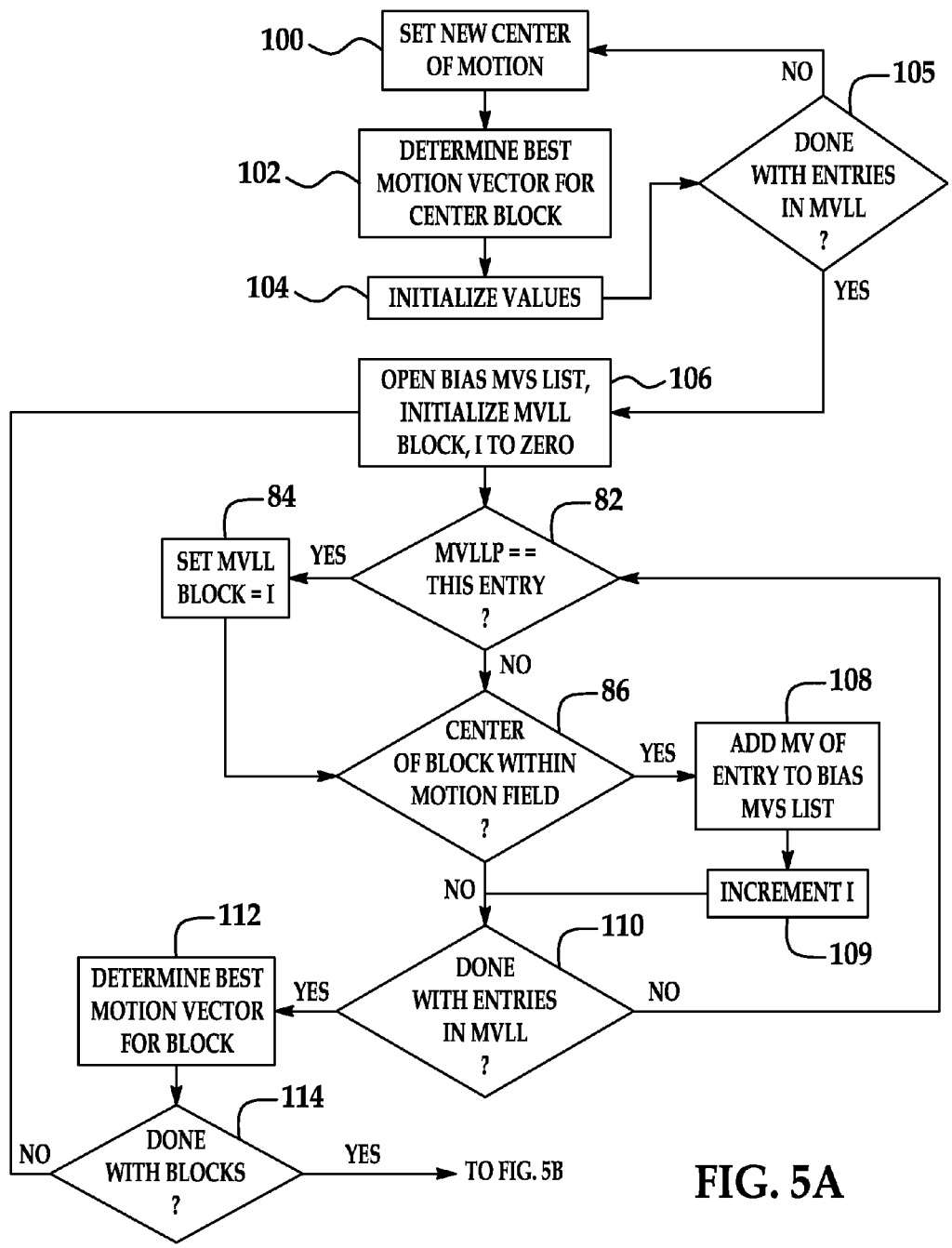
FIGS. 5A and 5B include a flow chart illustrating an exemplary method of encoding motion fields for frames subsequent to a first frame using the intra/inter prediction stage of the encoder shown in FIG. 2.
Figure 5B:
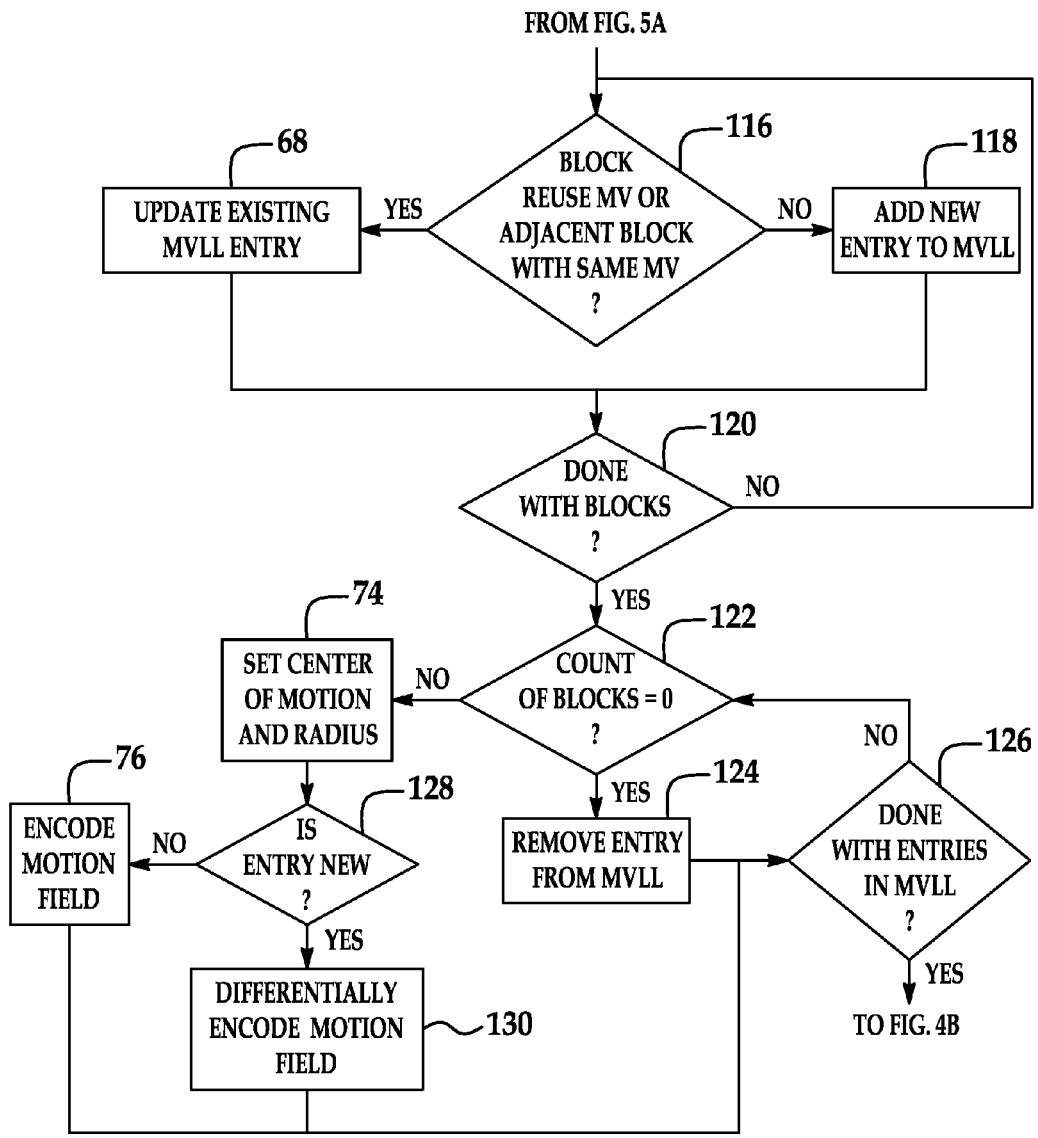

FIGS. 5A and 5B include a flow chart illustrating an exemplary method of encoding motion fields for frames subsequent to a first frame using the intra/inter prediction stage 26 shown in FIG. 2. Where steps are duplicative of steps from FIGS. 4A and 4B, the same reference numbers are used and their descriptions are not repeated in their entirety.

Control first sets a new center of motion for an entry in the linked list mvll by shifting its center of motion from the previous frame by its motion vector (100). More specifically, new center of motion row is set to center of motion row plus the row shift indicated by the motion vector of the previous frame, and new center of motion column is set to center of motion column plus the column shift indicated by the motion vector of the previous frame.

Figure 6:
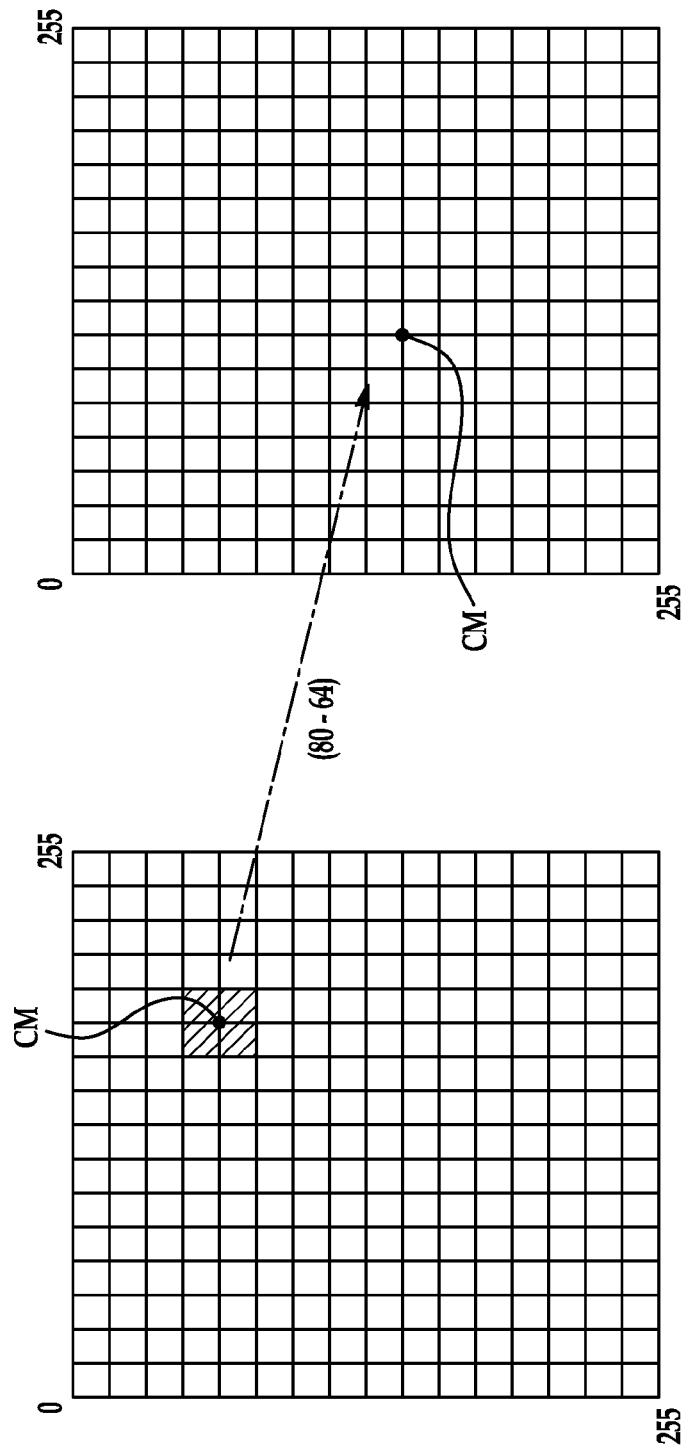
FIG. 6 is a block diagram illustrating the shift of a center of motion by its motion vector.

FIG. 6 is a block diagram illustrating the shift of a center of motion by its motion vector. For illustrative purposes only the lines in FIG. 6 indicate macroblocks of 16 pixels×16 pixels in frames comprising 256 pixels by 256 pixels. A motion field is shaded in the previously coded frame. For simplicity, the motion field shown encompasses four macroblocks. The center of motion cm is located in the previously coded frame such that center of motion row is 63 and center of motion column is 175. By example, the motion vector for this is (80, −64). As shown in the current frame, the new center of motion is located at center of motion row 143 and center of motion column 111.

After setting the center of motion in the frame, the best motion vector for the block at the center of motion of the current entry in the linked list mvll is determined (102). This can be done accordingly to any known method. This best motion vector is used to update motion vector row and motion vector column in linked list mvll for the center of motion.

Variables for the current entry in the linked list mvll are initialized (104).

Specifically, the following variables are initialized to zero:
sum of row positions;
sum of column positions;
minimum row;
maximum row;
minimum column;
maximum column;
count of blocks; and
new.

After initializing variables, whether all of the entries in the linked list mvll have been analyzed is determined (105). If not, the next entry is analyzed by first setting a new center of motion (100), then determining the best motion vector for the center block (102) and finally initializing the values previously described for that next entry of linked list mvll (104). If all entries in the linked list mvll have been analyzed, a list named bias mvs for a block in the frame is opened (106). Bias mvs is initially an empty list. Further, mvll block and counter i described previously are again initialized to zero. After these initializations, the pointer mvllp for the block is checked as to whether it is associated with the current entry in the linked list mvll (82). If so, mvll block is set to counter i (84). Whether mvll block is set to counter i (84) or the pointer mvllp for the block is not associated with the current entry in the linked list mvll (82), a query is made as to whether the center of the current block is within the motion field (86). For this analysis, the radius is unchanged from that used in for the previous frame, but the center of motion row and center of motion column are updated as described previously (100).

If the current block is within the motion field (86), the motion vector of the current entry in the linked list mvll is added to list bias mvs (108) and counter i is incremented (109). If the current block is not within the motion field (86), list bias mvs and counter i are not updated.

If all of the entries in the linked list mvll have not been compared to the current block (110), the next entry in the linked list mvll is processed with respect to the current block (82). The described sequence is repeated until all of the entries have been compared to the current block (110). Then, the best motion vector for the current block is determined with a bias toward using one of the bias mvs. (112) Again, the best motion vector is determined according to known methods of comparing a calculated motion vector against these available alternative motion vectors, such as rate distortion optimized motion estimation.

If all blocks have not been processed (114), a new block is selected for processing and a new bias mvs list is opened (106) to repeat the process.

If all blocks have been processed (114), the block counter is initialized again and a query is made as to whether the current block reuses a motion vector from the bias mvs list or if the current block is adjacent to any block with the same motion vector (116) as shown in FIG. 5B. If so, the existing entry in the linked list mvll associated with that motion vector is updated (68). Otherwise, a new entry is added to the linked list mvll (118). The process for adding new entry here (118) is the same as that discussed with respect to FIG. 4A (70) except that the variable new is set to 1.

Whether an existing entry of linked list mvll is updated (68) or a new entry is added to linked list mvll (118), a determination is made as to whether all blocks have been processed (120). If all blocks have not been processed, processing repeats with a new block. That is, a query is made as to whether the new block reuses a motion vector from the bias mvs list or if the new block is adjacent to any block with the same motion vector (116). Depending on the response, an existing entry in the linked list mvll is updated (68) or a new entry is added to the linked list mvll (118).

When all blocks are processed (120), each entry in the linked list mvll is checked to determine whether its variable count of blocks is equal to zero (122). If the entry has a count of zero, indicating that no block is associated with the entry, the entry is removed from the linked list mvll (124).

Whenever an entry has a block count (that is, count of blocks does not equal zero), the center of motion row, column and radius for the mvll entry are set as described previously (74). If the entry is new (128), the motion field is encoded into the bitstream as described previously (76). If the entry is not new (128), the motion field is encoded differentially from the last frame's corresponding entry in the linked list mvll using any number of known techniques of differential encoding (130).

Once all entries in the linked list mvll have been processed (126), that is, after all of the motion fields are encoded, the processing in FIG. 4B for the encoding of the blocks is performed starting with initializing mvll block and counter i to zero (80).

According to the foregoing description, a center of motion is defined as a position in the video frame that is the center of a piece of the video frame in which all of the surrounding pixels are moving in the same direction. The center of motion's position, radius and motion vector define a motion field encoded into the bitstream. For pieces of the frame (blocks and/or macroblocks) in which centers of motion overlap, bits are encoded to define which motion vector is used. Otherwise, no further motion vector is needed. Subsequent frames can use the motion field by moving the position of the center of motion by its motion vector and then differentially encoding a new radius and/or motion vector.

Figure 7:
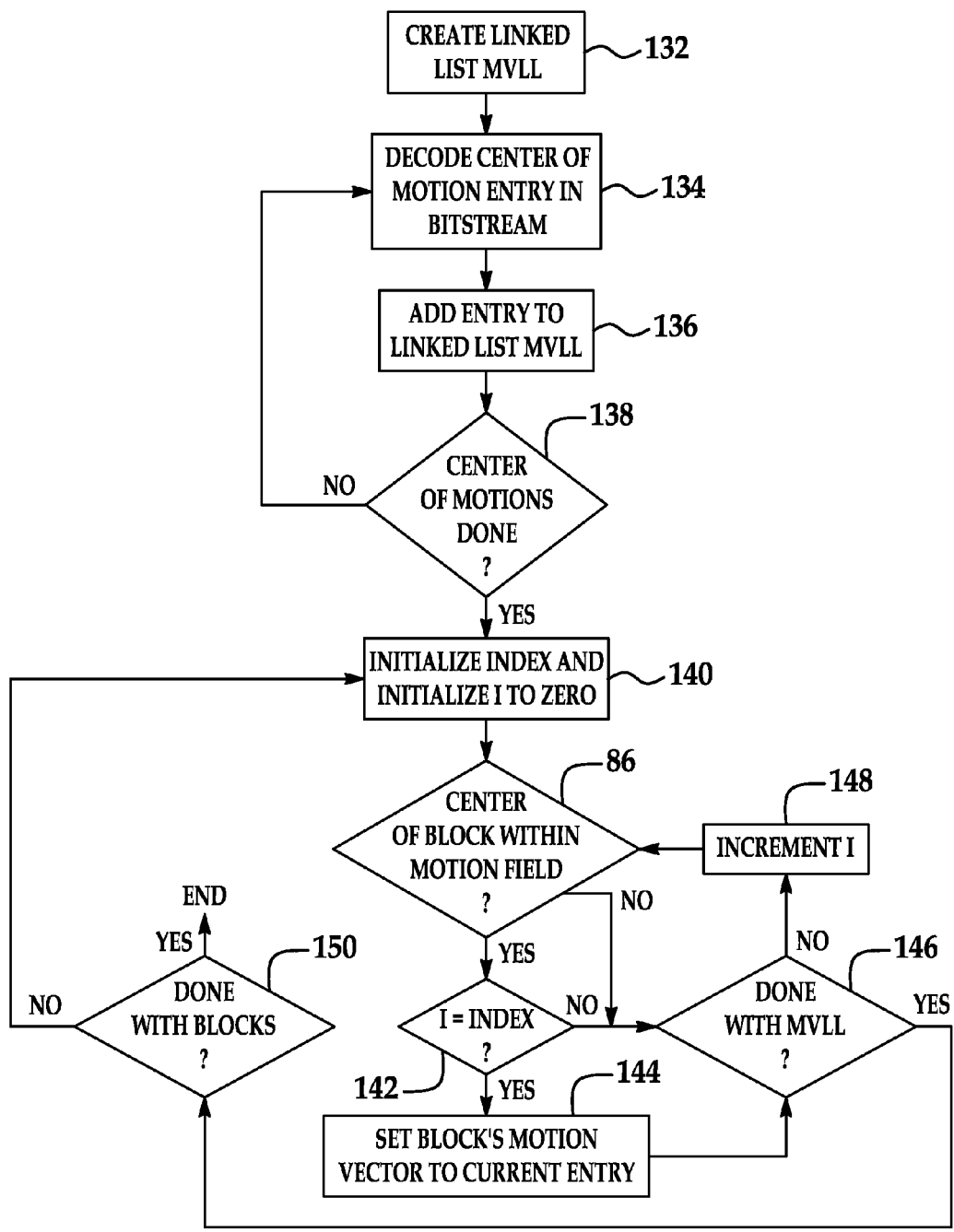
FIG. 7 includes a flow chart illustrating an exemplary method of decoding motion fields for frames using the intra/inter prediction stage of the decoder shown in FIG. 3.

Intra/inter prediction stage 52 of decoder 42 receives the encoded motion fields and processes them in conjunction with the encoded blocks to reconstruct each frame. According to an embodiment herein, the encoded motion fields are decoded and blocks are associated with their respective centers of motion according to the flow chart of FIG. 7. FIG. 7 includes a flow chart illustrating an exemplary method of decoding motion fields for frames using the intra/inter prediction stage of the decoder shown in FIG. 3.

First, an empty linked list mvll is created (132). Next, each center of motion entry in the bitstream is decoded (134) and added to the linked list mvll (136). A determination is next made as to whether there are additional center of motion entries in the bitstream (138). Once all entries have been decoded and added to linked list mvll, the blocks are associated with one of the entries of linked list mvll and thusly associated with a motion vector.

More specifically, a counter i is initialized to zero (140). Also, an index for a current block in the frame received from the bitstream is set to the decode index of the block. That is, a value called index is set to the value that indicates which of the centers of motion should be used for a decoded block. This value is, for example, mvll block as determined in FIG. 4B (88).

For this current block, it is first determined whether the center of the current block is within the motion field of the current entry in the linked list mvll (86). The comparisons of this step are described previously with respect to FIG. 4B. If the center of the current block is within the motion field of the current entry in the linked list mvll, a query is made as to whether counter i is equal to the index (142). If so, the current block's motion vector is set to that of the center of motion for the current entry in the linked list mvll (144). A query is then performed to confirm whether or not all items in the linked list mvll have been compared to the current block (146). While there are other entries to compare, counter i is incremented (148), and the block is compared to the motion field of the next mvll entry (86).

Once all of the entries in the linked list mvll have been compared to the current block (146), it is confirmed whether there are additional blocks in the bitstream needing assignment of a motion vector (150). If all blocks are done, control ends. The remainder of the decoding process can conventionally proceed. If there are additional blocks (150), the next block is selected, the counter i is reinitialized, and the value index is set (140). Then, the remaining steps are performed to set the block's motion vector.

It is possible to use this technique to define a global motion vector by specifying a center of motion at the center of the frame and a radius that would encompass the entire frame. All blocks would thus have the option of using this global motion vector when determining the best motion vector in, for example, FIG. 5A (112).

The embodiments as disclosed herein can be practiced with a variety of encoding schemes, including for example derivatives of VPx and H.264.

The operation of encoding can be performed in many different ways and can produce a variety of encoded data formats. The above-described embodiments of encoding or decoding may illustrate some exemplary encoding techniques. However, in general, encoding and decoding are understood to include any transformation or change of data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 can be implemented can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms and/or instructions described herein.

Further, portions of encoder 20 and/or decoder 42 do not necessarily have to be implemented in the same manner. Thus, for example, intra/inter prediction stage 26 can be implemented in software whereas transform stage 28 can be implemented in hardware. The above-described embodiments of encoding or decoding may illustrate some exemplary encoding techniques. However, in general, encoding and decoding as those terms are used in the claims are understood to mean compression, decompression, transformation or any other change to data whatsoever.

Further, all or a portion of embodiments described herein can take the form of a computer program product accessible from, for example, a computer-usable or computer-readable medium. A computer-usable or computer-readable medium can be any device that can, for example contain, store, communicate, and/or transport the program for use by or in connection with any computing system or device. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames including blocks each having pixels, comprising:
    determining, using a processor, at least a first motion field and a second motion field in a first frame, each of the first motion field and the second motion field including at least two blocks having a same direction of movement as each other, the first motion field having a first field center of motion, at least one dimension defining a shape of the first motion field and a first field motion vector, and the second motion field having a second field center of motion, at least one dimension defining a shape of the second motion field and a second field motion vector, the determining including:
        determining a motion vector for each block of a plurality of blocks of the first frame;
        assigning each block of the plurality of blocks of the first frame into one of a plurality of groups based on a proximity of the block to others having the same motion vector, such that each block assigned to a first group of the plurality of groups is adjacent to another block assigned to the first group, and that each block assigned to a second group of the plurality of groups is adjacent to another block in the second group;
        calculating the first field center of motion and the at least one dimension defining the shape of the first motion field using dimensions of the plurality of blocks forming the first group of the plurality of groups, the first field motion vector being a motion vector of the first group of blocks; and
        calculating the second field center of motion and the at least one dimension defining the shape of the second motion field using dimensions of the plurality of blocks forming the second group of the plurality of groups, the second field motion vector being a motion vector of the second group of the plurality of groups;
        wherein the first motion field and the second motion field overlap such that at least a portion of at least one block of the first frame is encompassed within both the first motion field and the second field, each such block defining an overlapping block;
    encoding the first motion field into a bitstream by encoding the first field center of motion, the at least one dimension defining the shape of the first motion field and the first field motion vector into the bitstream;
    encoding the second motion field into the bitstream by encoding the second field center of motion, the at least one dimension defining the shape of the second motion field and the first field motion vector into the bitstream;
    associating a first overlapping block of the first frame with one of the first motion field or the second motion field;
    encoding each block associated with the first motion field into the bitstream without a separate motion vector; and
    encoding each block associated with the second motion field into the bitstream without a separate motion vector.

2. The method of claim 1, further comprising:
    moving the first field center of motion for the first motion field by the first field motion vector in a second frame; and
    differentially encoding at least one of a new dimension and a new field motion vector for the first motion field in the second frame.

3. The method of claim 1 wherein assigning each block comprises:
    creating list entries for unique motion vectors in the first frame, the list entries including a motion vector and a row position and a column position corresponding to blocks sharing each motion vector of the unique motion vectors;
    comparing a motion vector for a first block to a motion vector for an adjacent block;
    adding the motion vector for the first block, a row position of the first block and a column position of the first block to the list entries when the motion vector for the first block is not the same as the motion vector for the adjacent block; and
    updating the row position and the column position in the list entries of the motion vector for the adjacent block to include the row position of the first block and the column position of the first block when the motion vector for the first block is the same as the motion vector for the adjacent block; and wherein each list entry defines one group of the plurality of groups.

4. The method of claim 3 wherein calculating the first field center of motion comprises determining an average row position and an average column position of the first group of the plurality of groups.

5. The method of claim 3 wherein calculating the at least one dimension defining the shape of the first motion field comprises determining a maximum distance between a beginning and ending of the row position and a beginning and ending of the column position for the first group.

6. The method of claim 1, further comprising:
    defining a global motion field encompassing the first frame, the global motion field including a global motion vector and a center of motion at a center of the first frame; and
    associating a second overlapping block with one of the first motion field, the second motion field or the global motion field.

7. The method of claim 6 wherein determining the motion vector for each block of the plurality of blocks of the first frame comprises:
    calculating an actual motion vector for each block of the plurality of blocks;
    respectively comparing the actual motion vector for each block of the plurality of blocks to the global motion vector; and
    selecting whichever of the actual motion vector or the global motion vector results in a lower bit cost as the motion vector for each block of the plurality of blocks.

8. The method of claim 1, further comprising:
    comparing row and column positions of the first overlapping block to the first field center of motion and the at least one dimension of the first motion field; and wherein associating the first overlapping block with one of the first motion field or the second motion field comprises associating the first block with the first motion field when the comparing shows that a center of the first overlapping block is encompassed by the first motion field.

9. The method of claim 1, further comprising:
determining a plurality of motion fields for the first frame;
encoding each of the plurality of motion fields into the bitstream;
associating each of the plurality of blocks of the first frame with one of the plurality of motion fields; and
encoding each block associated with a respective one of the plurality of motion fields into the bitstream without separate motion vectors.

10. The method of claim 9, further comprising:
moving each field center of motion by its respective field motion vector in a second frame subsequent to the first frame;
calculating a motion vector for a center block of each of the plurality of motion fields;
comparing each of a plurality of blocks in the second frame to the plurality of motion fields associated with each center block;
creating a list of possible motion vectors by including a field motion vector of a motion field in the list where a result of comparing each of the plurality of blocks to the plurality of motion fields indicates that one of the plurality of blocks is within that motion field;
calculating an actual motion vector for each of the plurality of blocks of the second frame;
respectively comparing the actual motion vector for each of the plurality of blocks of the second frame to the list of possible motion vectors;
selecting one of the actual motion vector or a motion vector of the list of possible motion vectors resulting in a lowest bit cost as the motion vector for each of the plurality of blocks of the second frame;
grouping each of the plurality of blocks of the second frame into a plurality of groups based on a proximity of respective ones of the plurality of blocks to others having the same motion vector, each group defining a motion field for the second frame;
calculating a field center of motion and at least one dimension defining a shape of each motion field using dimensions of each group; and
differentially encoding at least certain motion fields of the second frame.

11. A method for decoding a video bitstream having a plurality of frames including blocks containing pixels, comprising:
decoding a plurality of motion fields received from the video bitstream using a processor, each of the plurality of motion fields having a field center of motion, at least one dimension defining a shape of the motion field in a first frame and a field motion vector, the plurality of motion fields including at least a first motion field and a second motion field;
receiving a plurality of blocks from the video bitstream, each block of the plurality of blocks comprising a plurality of pixels of a first frame and the first motion field and the second motion field overlapping each other such that at least a portion of at least one block of the plurality of blocks is encompassed within the first motion field and the second motion field, each such block defining an overlapping block;
comparing a position of a first block with the first motion field;
where the position of the first block is within the shape of the first motion field, comparing an index value of the block with an identification value of the first motion field;
setting a motion vector of the first block to the field motion vector of the first motion field where the index value of the first block matches the identification value of the first motion field;
where the index value of the first block does not match the identification value of the first motion field, comparing the index value of the first block with an identification value the second motion field; and
setting the motion vector of the first block to the field motion vector of the second motion field where the index value of the first block matches the identification value of the second motion field, the first block being a first overlapping block.

12. The method of claim 11 wherein the at least one dimension comprises a radius and comparing the position of the first block with the first motion field includes:
comparing a column position of a center of the first block with a minimum column position and a maximum column position of the first motion field as defined by its field center of motion and its radius; and
comparing a row position of the center of the first block with a minimum row position and a maximum row position of the first motion field as defined by its field center of motion and its radius; and wherein the position of the first block is within the shape of the first motion field when its column position is between the minimum and the maximum column positions and its row position is between the minimum and the maximum row positions.

13. An apparatus for encoding a video signal having a plurality of frames including blocks each having pixels, comprising:
a memory; and
a processor configured to execute instructions stored in the memory to:
determine at least a first motion field and a second motion field in a first frame, each of the first motion field and the second motion field including at least two blocks having a same direction of movement as each other, the first motion field having a first field center of motion, at least one dimension defining a shape of the first motion field and a first field motion vector, and the second motion field having a second field center of motion, at least one dimension defining a shape of the second motion field and a second field motion vector, by:
determining a motion vector for each block of a plurality of blocks of the first frame;
assigning each block of the plurality of blocks of the first frame into one of a plurality of groups based on a proximity of the block to others having the same motion vector, such that each block assigned to a first group of the plurality of groups is adjacent to another block assigned to the first group, and that each block assigned to a second group of the plurality of groups is adjacent to another block in the second group;
calculating the first field center of motion and the at least one dimension defining the shape of the first motion field using dimensions of the plurality of blocks forming the first group of the plurality of groups, the first field motion vector being a motion vector of the first group of blocks; and calculating the second field center of motion and the at least one dimension defining the shape of the second motion field using dimensions of the plurality of blocks forming the second group of the plurality of groups, the second field motion vector being a motion vector of the second group of the plurality of groups;

wherein the first motion field and the second motion field overlap such that at least a portion of at least one block of the first frame is encompassed within both the first motion field and the second field, each such block defining an overlapping block;

encode the first motion field into a bitstream by encoding the first field center of motion, the at least one dimension defining the shape of the first motion field and the first field motion vector into the bitstream;

encode the second motion field into the bitstream by encoding the second field center of motion, the at least one dimension defining the shape of the second motion field and the first field motion vector into the bitstream;

associate a first overlapping block of the first frame with one of the first motion field or the second motion field;

encode each block associated with the first motion field into the bitstream without a separate motion vector; and encode each block associated with the second motion field into the bitstream without a separate motion vector.

14. The apparatus of claim 13 wherein the processor is configured to:

determine a plurality of motion fields for the first frame;

encode each of the plurality of motion fields into the bitstream;

associate each of the plurality of blocks of the first frame with one of the plurality of motion fields; and encode each block associated with a respective one of the plurality of motion fields into the bitstream without separate motion vectors.

15. The apparatus of claim 14 wherein the processor is configured to:

move each field center of motion by its respective field motion vector in a second frame subsequent to the first frame;

calculate a motion vector for a center block of each of the plurality of motion fields;

compare each of a plurality of blocks in the second frame to the plurality of motion fields associated with each center block;

create a list of possible motion vectors by including a field motion vector of a motion field in the list where a result of comparing each of the plurality of blocks to the plurality of motion fields indicates that one of the plurality of blocks is within that motion field;

calculate an actual motion vector for each of the plurality of blocks of the second frame;

respectively compare the actual motion vector for each of the plurality of blocks of the second frame to the list of possible motion vectors; select one of the actual motion vector or a motion vector of the list of possible motion vectors resulting in a lowest bit cost as the motion vector for each of the plurality of blocks of the second frame;

group each of the plurality of blocks of the second frame into a plurality of groups based on a proximity of respective ones of the plurality of blocks to others having the same motion vector, each group defining a motion field for the second frame;

calculate a field center of motion and at least one dimension defining a shape of each motion field using dimensions of each group; and differentially encode at least certain of the motion fields of the second frame.

16. The apparatus of claim 13 wherein the processor is configured to:

compare row and column positions of a first block to the first field center of motion and the at least one dimension of the first motion field; and associate the first block with the motion field when the comparing shows that a center of the first block is encompassed by the motion field.

17. The apparatus of claim 13 wherein the processor is configured to:

move the field center of motion for the first motion field by the first field motion vector in a second frame; and differentially encode at least one of a new dimension and a new field motion vector for the first motion field in the second frame.

18. The apparatus of claim 13 wherein the processor is configured to:

define a global motion field encompassing the first frame, the global motion field including a global motion vector and a center of motion at a center of the first frame;

determine the motion vector for each of the plurality of blocks of the first frame by:

calculating an actual motion vector for each of the plurality of blocks;

respectively comparing the actual motion vector for each of the plurality of blocks to the global motion vector; and selecting whichever of the actual motion vector or the global motion vector results in a lower bit cost as the motion vector for each of the plurality of blocks.

19. An apparatus for encoding a video signal having a plurality of frames including blocks each having pixels, comprising:

a memory; and a processor configured to execute instructions stored in the memory to:

determine a motion field for a plurality of pixels in a first frame having a same direction of movement as each other, the motion field having a field center of motion, at least one dimension defining a shape of the motion field and a field motion vector, by:

determining a motion vector for each of a plurality of blocks of the first frame;

grouping the motion vectors for each of the plurality of blocks of the first frame into a plurality of groups based on a proximity of respective ones of the plurality of blocks to others having the same motion vector; and calculating the field center of motion and the at least one dimension defining the shape of the motion field using dimensions of the plurality of blocks forming a group of the plurality of groups;

encode the motion field into a bitstream;

associate at least one block of the first frame with the motion field; and encode each block associated with the motion field into the bitstream without a separate motion vector; and wherein the processor is configured to:

define a global motion field encompassing the first frame, the global motion field including a global motion vector and a center of motion at a center of the first frame; and encode dimensions for the global motion field such that an entirety of the first frame falls within the global motion field.

20. The apparatus of claim 13 wherein the processor is configured to:
- defining a global motion field encompassing the first frame, the global motion field including a global motion vector and a center of motion at a center of the first frame; and
- encode dimensions for the global motion field such that an entirety of the first frame falls within the global motion field.

21. The apparatus of claim 13 wherein the processor is configured to:
- define a global motion field encompassing the first frame, the global motion field including a global motion vector and a center of motion at a center of the first frame; and
- associate a second overlapping block with one of the first motion field, the second motion field or the global motion field.

* * * * *

UNITED STATES PATENT AND TRADEMARK OFFICE
CERTIFICATE OF CORRECTION

PATENT NO. : 8,891,626 B1
APPLICATION NO. : 13/080266
DATED : November 18, 2014
INVENTOR(S) : James Bankoski et al.

Page 1 of 1

It is certified that error appears in the above-identified patent and that said Letters Patent is hereby corrected as shown below:

Title Page 2, Column 2, References Cited, Other Publications, Line 59, "Maria" should be "Marta"

Signed and Sealed this
Twenty-fourth Day of March, 2015

Michelle K. Lee
*Director of the United States Patent and Trademark Office*